US009536157B2

United States Patent
Zobel

(10) Patent No.: US 9,536,157 B2
(45) Date of Patent: Jan. 3, 2017

(54) METHOD FOR IDENTIFICATION OF A PROJECTED SYMBOL ON A STREET IN A VEHICLE, APPARATUS AND VEHICLE

(71) Applicant: Conti Temic microelectronic GmbH, Nuremberg (DE)

(72) Inventor: Matthias Zobel, Wasserburg (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 0 days.

(21) Appl. No.: 14/639,215

(22) Filed: Mar. 5, 2015

(65) Prior Publication Data
US 2015/0254515 A1    Sep. 10, 2015

(30) Foreign Application Priority Data
Mar. 5, 2014    (DE) ........................ 10 2014 204 002

(51) Int. Cl.
*G06K 9/00* (2006.01)
*G06K 9/20* (2006.01)

(52) U.S. Cl.
CPC ....... *G06K 9/00818* (2013.01); *G06K 9/00791* (2013.01); *G06K 9/00798* (2013.01); *G06K 9/2036* (2013.01)

(58) Field of Classification Search
None
See application file for complete search history.

(56) References Cited

U.S. PATENT DOCUMENTS

| | | | | |
|---|---|---|---|---|
| 6,829,388 B1* | 12/2004 | Sakurai | ................. | G06T 7/0083 340/435 |
| 7,782,184 B2 | 8/2010 | Wittorf et al. | | |
| 7,843,362 B2* | 11/2010 | Augst | ................. | B62D 15/027 340/435 |
| 8,854,464 B2 | 10/2014 | Ishi et al. | | |
| 9,318,018 B2* | 4/2016 | Park | ......................... | G08G 1/00 |
| 2004/0247157 A1* | 12/2004 | Lages | ................ | G06K 9/00805 382/103 |
| 2006/0080005 A1 | 4/2006 | Lee et al. | | |
| 2007/0177011 A1 | 8/2007 | Lewin et al. | | |
| 2008/0089557 A1 | 4/2008 | Iwaki et al. | | |

(Continued)

FOREIGN PATENT DOCUMENTS

| | | |
|---|---|---|
| DE | 102006026092 | 12/2007 |
| DE | 102006050546 | 4/2008 |

(Continued)

OTHER PUBLICATIONS

German Search Report for German Patent Application No. 10 2014 204 002.7, dated Jan. 30, 2015, 10 pages, Muenchen, Germany, with English translation, 9 pages.

*Primary Examiner* — Vu Le
*Assistant Examiner* — Samah Beg
(74) *Attorney, Agent, or Firm* — W. F. Fasse

(57) ABSTRACT

A method and a camera-based driver assistance system in a subject vehicle uses image processing to automatically recognize dynamic intangible symbols that are projected as light onto the road by another vehicle, and responds in an appropriate manner based on the recognized symbols. For example, advice is given to the driver or signals are transmitted to vehicle devices in order to bring about an appropriate vehicle response, such as an emergency braking action or a distance alert.

14 Claims, 2 Drawing Sheets

(56) References Cited

U.S. PATENT DOCUMENTS

| | | | |
|---|---|---|---|
| 2008/0249710 A1* | 10/2008 | Takada | G01C 21/3461 701/417 |
| 2009/0013922 A1 | 1/2009 | Lin | |
| 2009/0265061 A1* | 10/2009 | Watanabe | G08G 1/165 701/36 |
| 2010/0060487 A1 | 3/2010 | Augst | |
| 2010/0253539 A1* | 10/2010 | Seder | G01S 13/723 340/903 |
| 2010/0253688 A1* | 10/2010 | Cui | G01S 13/723 345/443 |
| 2011/0128141 A1* | 6/2011 | Purks | B60Q 1/38 340/475 |
| 2011/0216196 A1 | 9/2011 | Ishi et al. | |
| 2012/0128210 A1* | 5/2012 | Zobel | G06K 9/42 382/103 |
| 2012/0140988 A1 | 6/2012 | Takahashi | |
| 2012/0185161 A1* | 7/2012 | Zobel | G06K 9/00798 701/409 |
| 2012/0245832 A1* | 9/2012 | Meis | G08G 1/167 701/116 |
| 2013/0058534 A1* | 3/2013 | Zobel | G06K 9/50 382/103 |
| 2013/0101174 A1* | 4/2013 | Meis | G08G 1/096716 382/104 |
| 2013/0162826 A1* | 6/2013 | Zhang | H04N 7/002 348/148 |
| 2013/0179023 A1* | 7/2013 | Schmidt | G05D 1/021 701/23 |
| 2013/0242102 A1* | 9/2013 | Tsuchiya | G08G 1/166 348/148 |
| 2014/0119605 A1* | 5/2014 | Zobel | G06K 9/00818 382/103 |
| 2014/0139677 A1* | 5/2014 | Lambert | B60K 35/00 348/148 |
| 2014/0152432 A1* | 6/2014 | Zobel | G08G 1/167 340/435 |
| 2014/0214260 A1 | 7/2014 | Eckert et al. | |
| 2014/0300738 A1* | 10/2014 | Mueller | B60R 11/04 348/148 |
| 2015/0145664 A1* | 5/2015 | You | B60W 30/12 340/438 |
| 2015/0203023 A1* | 7/2015 | Marti | B60Q 1/00 340/425.5 |

FOREIGN PATENT DOCUMENTS

| | | | |
|---|---|---|---|
| DE | 102007050830 | | 4/2009 |
| DE | 102011005056 | | 12/2011 |
| EP | 1 334 869 | | 8/2003 |
| EP | 1916153 | * | 4/2008 |
| EP | 2 000 356 | | 12/2008 |
| WO | WO 2012/101430 | | 8/2012 |

\* cited by examiner

METHOD FOR IDENTIFICATION OF A PROJECTED SYMBOL ON A STREET IN A VEHICLE, APPARATUS AND VEHICLE

TECHNICAL FIELD

The present invention relates to image-based sign recognition. In particular, the present invention relates to the automatic, image-based sign recognition of non-stationary projections onto a road made by other road users. In particular, the invention relates to a method for identifying a projected symbol on a road in a vehicle, to a device for identifying a projected symbol and to a vehicle.

TECHNICAL BACKGROUND

Automatic, image-based traffic sign recognition methods take pictures of the surroundings of a vehicle by means of a camera. Such systems interpret the recorded image data and subsequently incorporate this information into one or several driver assistance function(s). A typical application are image-based carriageway recognition methods which use the camera image to obtain information relating to the own or to adjacent traffic lane(s). The recognition of carriageway information is a predestined field of use for a camera; no other sensor works equally well for this purpose. In particular, color can currently only be recognized using a suitable color camera.

SUMMARY OF THE INVENTION

It can be considered that the object of the invention is to provide improved driver assistance.

This object can be achieved by at least one respective embodiment of a method, a device and a motor vehicle with features according to the present invention.

The exemplary embodiments described herein relate equally to the method for identifying a projected symbol, to the device and to the vehicle. In other words, features which are described below with reference to the method can also be implemented as components in the device and therefore be considered as a feature of the device and of the vehicle including such a device. Of course this is also true in the reverse case. In particular, if not stated otherwise below, the computing unit of the device or the device itself can be designed to perform the method steps described below.

According to an exemplary embodiment of the invention, a method for identifying a projected symbol on a road in a vehicle is indicated. The method includes the step of producing an image of part of a road by a camera of the vehicle. At the same time, a symbol which is projected onto said part of the road by another road user is detected in the image. Subsequently, the symbol found in the image is identified, in particular by analyzing an image area which comprises the projected symbol. Based on the identified symbol, a signal is generated in order to bring about a measure in the vehicle.

Said signal can be generated inside the vehicle or outside the vehicle, both in this and in any other exemplary embodiment. For example, telematics services and/or communication channels can be used to transmit the signal to the vehicle if it has been generated outside the vehicle.

Details of this will be further explained in the context of specific exemplary embodiments.

In other words, this method detects a reflection of a symbol which is projected onto the road by another road user. Said identification of the symbol can also be done inside the vehicle as well as outside the vehicle, for example with the aid of telematics services.

For example, this method can be used in a camera-based driver assistance system. Using image processing methods, this method is also able to automatically recognize dynamic, in most cases colored, symbols or information which is/are projected onto the road by a vehicle ahead. Based on the recognized symbol, an appropriate response can be produced and brought about in the vehicle by means of the driver assistance system. For example, advice can be given to the driver by audible or visual indication or the driving dynamics of the vehicle can be adapted by means of a suitable system response, for example a distance alert or an emergency braking action. The aspects described before are of course part of the present invention. For example, an existing driver assistance system which offers lane detection according to the state of the art can be combined with or complemented by the method according to the invention.

The current development of novel lighting systems for vehicles, such as LED headlights, LED tail lights, laser headlights and laser tail lights, opens up numerous new opportunities which are far beyond just illuminating the road and the surroundings. In exemplary embodiments, it can also be part of the present invention to purposefully project symbols onto the carriageway, for example behind the vehicle.

Here, different shapes in combination with different colors and, for example, with varying light intensities can be used. A non-limiting example of a projection onto the carriageway would, for example, be a distance line which is intended to give advice to the vehicle behind, to which the driver of the vehicle behind and the device according to the invention can respond in an appropriate manner. For example, such a projected distance line can help to avoid driving to closely behind another vehicle. But also emergency symbols, such as projected warning triangles or a single projected warning triangle, can warn traffic behind of a dangerous situation at an early stage. It should be noted here that the projected symbols are, in general, projected by a moving road user and are not stationary on the road.

The method can, for example, be carried out by means of a device according to the invention which contains a camera and a computing unit. The computing unit can be part of the camera but can also be designed as a separate component outside the camera or as part of a driver assistance system. Other embodiments of the computing unit are also possible. In addition, the computing unit can be understood as a microcontroller, an evaluation unit or a processor.

It should be noted here that, in the context of the present invention, the term of "projected symbols" should be seen as dynamic intangible light symbols which are not stationary or fixed on the road but are emitted as light by another vehicle/road user. These projections of light by another vehicle, for example a vehicle ahead, are then projected onto the road to form the intangible light symbol which is then reflected by the road, so that these reflections can be detected by a camera of the device according to the invention.

According to another exemplary embodiment of the invention, the step of identifying the symbol comprises the identification of a color of the projected symbol and/or the identification of a variation in intensity of the projected symbol.

The method according to the invention is therefore able to detect information-carrying light of other road users, to extract the information contained therein and to generate a corresponding signal in order to bring about a measure in the vehicle. To detect said variation in intensity, a plurality of camera images are analyzed, for example at least two. The measure to be brought about can, for example, be a distance alert, a braking action, an acceleration, a warning given to a driver of the vehicle, an intervention in a longitudinal control of the vehicle, an intervention in a lateral control of the vehicle, an intervention in a longitudinal and a lateral control of the vehicle, an intervention in vehicle dynamics or another measure.

For example, the method can detect the frequency of a variation in intensity and the corresponding signal can be produced by comparing stored associations. Said associations can be stored inside the vehicle or outside the vehicle. A suitable memory unit can contain these associations in the vehicle. Alternatively, said associations can, for example, be provided on a server which is accessed by the vehicle by means of external communication.

According to another exemplary embodiment of the invention, the symbol is selected from the group consisting of a distance line extending transversely to a direction of travel of the vehicle, a line, triangle, red triangle, green triangle, blue triangle, traffic sign symbols, a stop sign, a speed limit, a traffic light symbol and any combination thereof.

According to another exemplary embodiment of the invention, the symbol is identified by an automatic image processing program in the vehicle.

Here, a camera takes pictures of said part of the road onto which the symbol is projected by the other vehicle, for example the vehicle ahead, and the automatic image processing program interprets the recorded image data. Subsequently, the corresponding signal is generated, which signal is, for example, provided to one or several driver assistance function(s). For example, the relevant computing unit of the device according to the invention can transmit the signal to the driver assistance system, so that the latter brings about the appropriate measure.

Here, diverse known methods of automatic pattern recognition from the field of computer vision can be used. Examples include edge-based methods, segmentation methods and/or classification approaches.

According to another exemplary embodiment of the invention, the method includes the step of transmitting the generated signal to a device of the vehicle in order for said device to bring about the measure.

Said device can be a driver assistance system but also just a component of a driver assistance system which requires the generated signal to bring about the appropriate measure in the vehicle. The measure to be brought about can be selected from the group consisting of a distance alert, a braking action, an acceleration, a warning given to a driver of the vehicle, an intervention in a longitudinal control of the vehicle, an intervention in a lateral control of the vehicle, an intervention in a longitudinal and a lateral control of the vehicle, an intervention in vehicle dynamics and any combination thereof.

Therefore, said device can for example be designed as a loudspeaker which gives an audible warning to the driver. Another embodiment would, for example, be a vibration unit arranged on the steering wheel of the vehicle in order to warn the driver by means of vibrations on the steering wheel. Signal transmission to the device which brings about the measure can be done wired or wireless within the vehicle. It should further be noted that bringing about the measure is part of an exemplary embodiment of the invention.

According to another exemplary embodiment of the invention, the vehicle performs situation recognition.

As a result of this, a corresponding signal, a so called situation signal, can be produced. Said situation signal is then compared with stored situation criteria. In this exemplary embodiment, the decision whether the signal is generated in order to bring about the measure is based on a result of said comparison, so that the signal is only generated if the generated situation signal meets the stored situation criteria.

For example, this method can be carried out by a driver assistance system which gains a certain understanding of the current intention of the own driver. Various vehicle signals are observed in order to draw conclusions on the intention of the driver to perform a discrete action, such as a lane change. Based on the intentions of the drivers involved in a traffic situation and other context information, the dangerousness of a traffic situation can then be assessed, for example by estimating the probabilities of a collision. In other words, this exemplary embodiment provides a combination with situation recognition and a method for recognizing projected information on the carriageway.

In other words, once the projected symbol on the road has been recognized, the next step is an analysis of the situation and the interpretation of the recognized symbol in order to bring about a response which fits the situation. For example, the situation may be interpreted by a fusion module which assesses the situation based on various input data, either continuously or based on certain events. Input data can, for example, include data from driver assistance systems, vehicle data, data from the navigation system, other telemetrically received data, etc. Depending on the assessment of the situation, a response is brought about which can be quite varied, e.g. a warning to the driver, transmission of telemetric information, intervention in the driving dynamics, etc. For example, a symbol recognized on an entrance to a controlled-access highway could bring about another system response than the same symbol on a curvy road or in urban traffic.

According to another exemplary embodiment of the invention, the method includes the further step of associating the identified symbol to the signal to be generated using associations stored in the vehicle.

This can be done inside the vehicle or outside the vehicle. For example, lists or just one list can be stored in a memory unit in the vehicle, where each symbol is assigned a corresponding signal to be generated. In this way, the device is provided with instructions as to which signal should be generated once certain symbols or just one symbol has/have been detected.

According to another exemplary embodiment of the invention, the generated signal is used in a driver assistance system of the vehicle to produce a warning or to intervene in the driving dynamics.

According to another exemplary embodiment of the invention, a device for identifying a projected symbol on a road for a vehicle is indicated. Said device includes a camera for producing images of part of a road and also includes a computing unit. The camera is designed to transmit images recorded by the camera to the computing unit, and the computing unit is designed to identify a symbol which is projected onto said part of the road by another road user and is recorded in one of the images taken by the camera. In addition, the computing unit is designed to generate a signal in order to bring about a measure in the vehicle based on the identified symbol.

In other words, a device for recognizing projected information on the carriageway is provided. A camera-based system is indicated which, for example, uses image processing methods to automatically recognize dynamic, for example also colored, symbols or information which is/are projected onto the road by a vehicle ahead. Based on the recognized symbols, the device can respond in an appropriate manner or bring about an appropriate response. For example, the device can give advice to the driver. Visual or audible signals can be used for this purpose. In certain exemplary embodiments it is also possible that this device brings about an intervention in the driving dynamics of the vehicle, for example a braking action, an acceleration, an intervention in the longitudinal control and/or an intervention in the lateral control of the vehicle.

For example, an existing driver assistance system can be complemented by the configurations and functions of the device described above and, as a result, be enhanced according to the present invention.

According to another exemplary embodiment of the invention, a vehicle including a device described above is indicated. The vehicle further includes a driver assistance system. Furthermore, the device is designed to transmit the signal generated by the computing unit to the driver assistance system. The driver assistance system is designed to bring about a measure based on the signal generated by the computing unit, which measure is selected from the group consisting of a distance alert, a braking action, an acceleration, a warning given to a driver of the vehicle, an intervention in a longitudinal control of the vehicle, an intervention in a lateral control of the vehicle, an intervention in a longitudinal and a lateral control of the vehicle, an intervention in vehicle dynamics, the transmission of telemetric information and any combination thereof.

According to another exemplary embodiment of the invention, a program element is indicated which, when executed on a processor, instructs the processor to carry out a method which is described in the context of the present invention. Said program element can be part of a computer program. Furthermore, the program element can also be an independent computer program itself. For example, the program element can be an update which enables an existing computer program to carry out the method according to the invention.

According to another exemplary embodiment of the invention, a computer-readable medium is indicated on which a program element is stored which, when executed on a processor, instructs the processor to carry out a method which is described in the context of the present invention. The computer-readable medium can be considered to be a storage medium, for example a USB stick, a CD, a DVD, a hard disk or another storage medium. Furthermore, the computer-readable medium can also be designed as a microchip which enables a driver assistance system to carry out the method according to the invention.

Further advantages, features and potential uses of the invention are shown in the following description of the exemplary embodiments and in the figures. In these, all features which are described and/or shown in the images form the subject matter of the invention, both individually and in any combination, also independently of their combination in the individual claims and of how the claims refer back to each other.

BRIEF DESCRIPTION OF THE FIGURES

The figures are schematic views and are not to scale. If the same or similar reference numerals are indicated in the description below in different figures, these designate identical or similar elements.

DETAILED DESCRIPTION OF EXEMPLARY EMBODIMENTS

Figure 1:
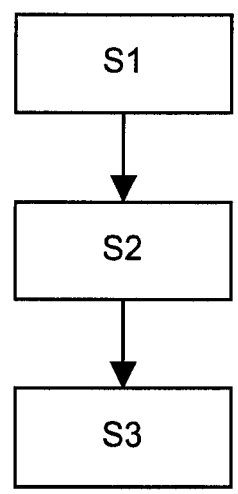
FIG. 1 shows a flow chart of a method according to an exemplary embodiment of the invention.

FIG. 1 shows a flow chart of a method for identifying a projected symbol on a road in a vehicle according to an exemplary embodiment of the invention. In other words, a method for recognizing projected information on the carriageway is provided. For example, this method of FIG. 1 can be carried out in a camera-based driver assistance system. Using, for example, image processing methods, this method is able to automatically recognize dynamic, also colored, symbols or information which is/are projected onto the road by a vehicle. Based on the recognized symbols, an appropriate response can be brought about in specific exemplary embodiments of this method. For example, advice can be given to the driver by a suitable system response, for example a distance alert or an emergency braking action.

In step S1 of the method of FIG. 1, an image of part of a road is produced by a camera of the vehicle, wherein a symbol is projected onto said part of the road by another road user, for example a vehicle ahead. Said symbol can, for example, be a distance line which extends transversely to the direction of travel of the vehicle, varies in intensity and has a certain color. Another example would be a red warning triangle of varying size which is projected onto the road by the vehicle ahead. In step S2 of the method of FIG. 1, the projected symbol is identified by analyzing the image produced by the camera. In other words, the symbol is recognized, so that it can be associated to a signal to be generated, for example according to an association available in the vehicle. For example, this step can be performed by a computing unit within the camera or within a driver assistance system. Subsequently, a signal is generated based on the identified symbol, which signal is designed to bring about a measure in the vehicle. This is step S3. In other words, said signal can be transmitted to a suitable device, for example a braking system of the vehicle, so that an emergency braking action is brought about. Another example of such a signal to be generated could be an audible warning sound played to the driver.

The method according to the invention shown in FIG. 1 can be complemented by numerous further steps, as they are described above and below. For example, the color of the projected symbol and/or a variation in intensity of the projected symbol can be detected, identified and classified in the method. The transmission of the corresponding signal which has been generated to a device in the vehicle is also part of an exemplary embodiment of FIG. 1. The exemplary embodiment of FIG. 1 can also be combined with situation recognition, as described above. Once the symbol has been identified, it can be associated to the signal to be generated using associations stored in the vehicle. The signal which is generated in step S3 can, for example, be used to produce a warning or to intervene in the driving dynamics in a driver assistance system.

Figure 2:
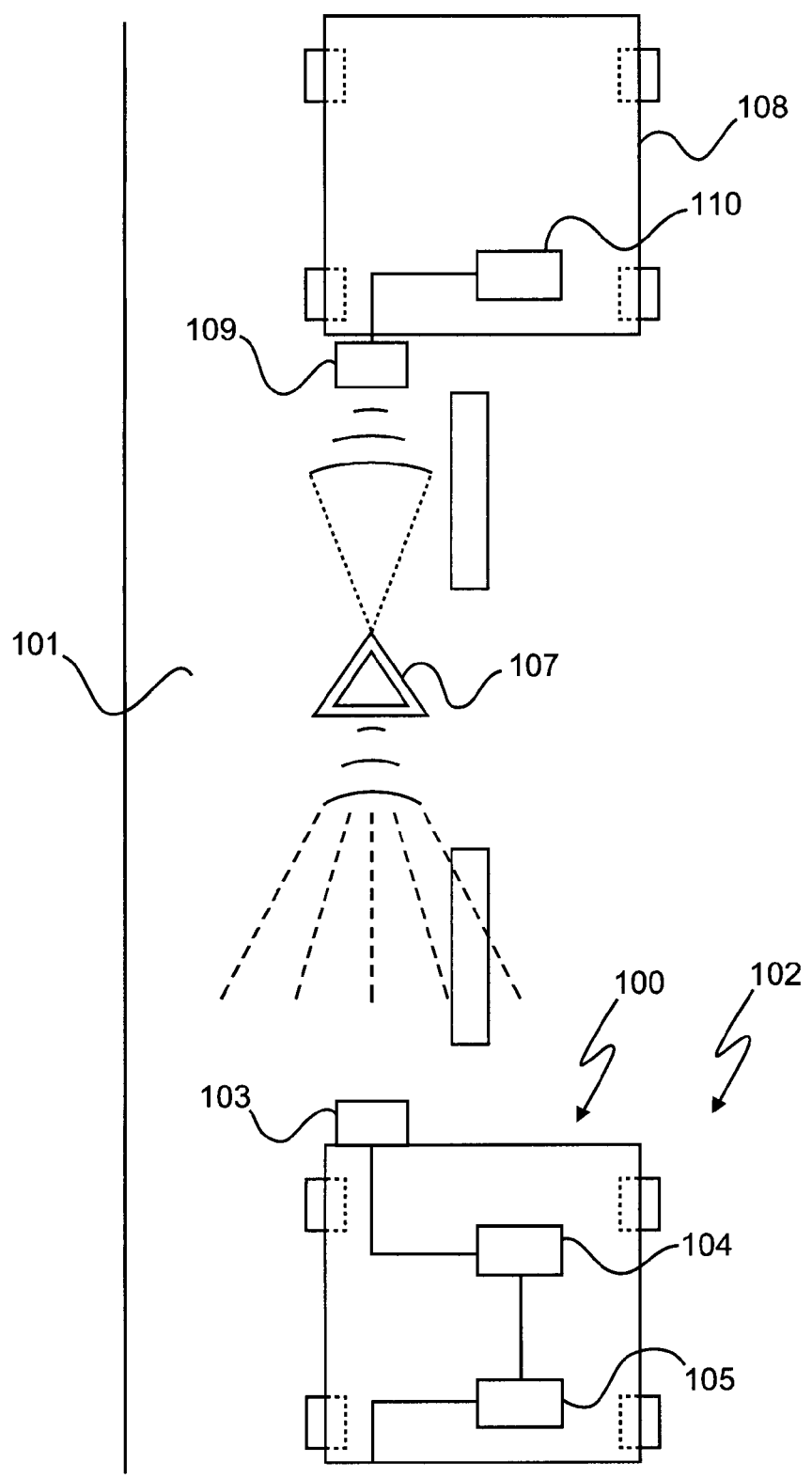
FIG. 2 shows a vehicle including a device for identifying a projected symbol on a road according to an exemplary embodiment of the invention.

FIG. 2 shows a vehicle 102 for identifying a projected symbol 107 on a road 101 according to an exemplary embodiment of the invention. This vehicle 102 includes a device 100 which is designed to identify the projected symbol. The device 100 includes a camera 103 for producing images of part of a road 101. The computing unit 104 is also part of the device according to the invention in the vehicle. The camera 103 transmits the recorded images to the computing unit 104. The computing unit 104 identifies the symbol 107 which is projected by the vehicle 108 ahead by means of a projector 109. The vehicle 108 ahead includes a control unit 110 for controlling said projector 109. The projected symbol 107 is not stationary on the road but moves relative to the road 101. This can be true of all exemplary embodiments of the present invention mentioned above. The computing unit 104 is also designed to generate a signal in order to bring about a measure in the vehicle based on the identified symbol. In the exemplary embodiment of FIG. 2, the computing unit 104 is arranged outside the camera 103. In another exemplary embodiment, the computing unit 104 could also be arranged inside the camera 103 or also inside the driver assistance system 105. The computing unit 104 is designed to transmit the signal produced by it to the driver assistance system 105. Furthermore, the driver assistance system 105 is designed to bring about one of the following measures based on the received signal. For example, the driver assistance system can give a distance alert to the driver, bring about a braking action, bring about an acceleration, bring about an intervention in a longitudinal control of the vehicle, bring about an intervention in a lateral control of the vehicle, or bring about an intervention in the vehicle dynamics as a whole. Of course combinations of the examples mentioned above are also possible.

In addition, it should be noted that "comprising" and "including" does not exclude other elements or steps and "one" or "a" does not exclude a plurality. Furthermore, it should be noted that features or steps which have been described with reference to one of the exemplary embodiments above, can also be used in combination with other features or steps of other exemplary embodiments described above. Reference numerals in the claims are not to be considered as limitations.

The invention claimed is:

1. A method for a subject vehicle driving on a road, the method comprising steps of:
    with a camera of the subject vehicle, capturing an image of a part of the road that has thereon an intangible symbol that is projected as light onto the part of the road by a road user other than the subject vehicle;
    with a computing unit of the subject vehicle, detecting, in the image, the intangible symbol on the part of the road;
    with the computing unit, identifying the intangible symbol detected in the image; and
    with the computing unit, generating a signal based on the identified intangible symbol in order to bring about a measure in the subject vehicle in response to and dependent on the identified intangible symbol.

2. The method according to claim 1, wherein the step of identifying the intangible symbol comprises identifying a color of the intangible symbol.

3. The method according to claim 1, wherein the intangible symbol is selected from the group consisting of a distance line extending transversely to a direction of travel of the subject vehicle, a stop sign, a speed limit symbol, a traffic light symbol and any combination thereof.

4. The method according to claim 1, wherein the identifying of the intangible symbol is performed by an automatic image processing program being executed by the computing unit in the subject vehicle.

5. The method according to claim 4, further including a step of transmitting the signal to a device of the subject vehicle, and with the device performing the measure, wherein the measure is selected from the group consisting of a distance alert, a braking action of the subject vehicle, an acceleration of the subject vehicle, a warning given to a driver of the subject vehicle, an intervention in a longitudinal control of the subject vehicle, an intervention in a lateral control of the subject vehicle, an intervention in a longitudinal control and a lateral control of the subject vehicle, an intervention in vehicle dynamics of the subject vehicle, a transmission of telemetric information from the subject vehicle, and any combination thereof.

6. The method according to claim 1, further including a step of performing a situation recognition by the computing unit in the subject vehicle.

7. The method according to claim 6, wherein the situation recognition comprises receiving input data from another system or component of the subject vehicle and comparing the input data to stored situation criteria to determine a current operating situation of the subject vehicle, and further comprising determining said measure in response to and dependent on both the signal and the current operating situation.

8. The method according to claim 1, further including a step of associating the identified intangible symbol to the signal to be generated using associations stored in the subject vehicle.

9. The method according to claim 1, further including a step of using the signal in a driver assistance system of the subject vehicle to perform the measure which comprises producing a warning or intervening in driving dynamics of the subject vehicle.

10. The method according to claim 1, wherein the step of identifying the intangible symbol comprises identifying a variation in intensity of the intangible symbol.

11. The method according to claim 1, wherein the intangible symbol moves along the road together with the other road user moving along the road, and the step of capturing an image comprises capturing a succession of images moving to further parts of the road to which the intangible symbol has moved.

12. A device for a subject vehicle driving on a road, the device including:
    a camera configured and arranged to capture images of a part of the road, and
    a processor arrangement,
    wherein the camera is further configured and arranged to transmit the images captured by the camera to the processor arrangement,
    wherein the processor arrangement is configured and arranged to identify, in at least one of the images, an intangible symbol that is projected as light onto said part of the road by a road user other than the subject vehicle, and
    wherein the processor arrangement is further configured and arranged to generate a signal in order to bring about a measure in the subject vehicle in response to and dependent on the identified intangible symbol.

13. A subject vehicle including:
    the device according to claim 12, and
    a driver assistance system,
    wherein the device is further configured and arranged to transmit the signal generated by the processor arrangement to the driver assistance system, and
    wherein the driver assistance system is configured and arranged to perform the measure based on the signal generated by the processor arrangement, which measure is selected from the group consisting of a distance alert, a braking action of the subject vehicle, an acceleration of the subject vehicle, a warning given to a driver of the subject vehicle, an intervention in a longitudinal control of the subject vehicle, an intervention in a lateral control of the subject vehicle, an intervention in a longitudinal control and a lateral control of the subject vehicle, an intervention in vehicle dynamics of the subject vehicle, a transmission of telemetric information from the subject vehicle, and any combination thereof.

14. The subject vehicle according to claim 13, further including a light projector and a control unit connected to the light projector, wherein the control unit and the light projector are configured and arranged to project light onto the road to form a light symbol on the road.

* * * * *